(12) United States Patent
Hopkins

(10) Patent No.: US 6,494,822 B1
(45) Date of Patent: Dec. 17, 2002

(54) TOOL RETENTION MECHANISM

(75) Inventor: Mark Frederick Hopkins, Cincinnati, OH (US)

(73) Assignee: Unova Ip Corp, Woodland Hills, CA (US)

(*) Notice: Subject to any disclaimer, the term of this patent is extended or adjusted under 35 U.S.C. 154(b) by 128 days.

(21) Appl. No.: 09/653,724

(22) Filed: Sep. 1, 2000

(51) Int. Cl.[7] ............................ B23Q 13/00; B23Q 3/155
(52) U.S. Cl. .................... 483/59; 211/69; 279/2.24; 294/97; 403/327; 403/330; 483/65
(58) Field of Search ...................... 279/2.01, 2.02, 279/2.22, 2.24, 23.1, 35, 43.6, 46.6; 82/160; 483/59, 65, 902; 211/70.6, 69; 248/27.3; 294/97, 99.1, 106; 403/326, 327, 330

(56) References Cited

U.S. PATENT DOCUMENTS

| | | | | |
|---|---|---|---|---|
| 3,390,891 A | * | 7/1968 | Stichhan | 279/23.1 |
| 3,568,849 A | * | 3/1971 | Hutchison | 483/59 |
| 3,822,790 A | * | 7/1974 | Armour et al. | 211/70.6 |
| 5,102,177 A | * | 4/1992 | Dreisig et al. | 294/106 |
| 5,154,686 A | * | 10/1992 | Klarer | 483/59 |
| D348,274 S | * | 6/1994 | Hallbach et al. | D15/140 |
| 5,851,093 A | * | 12/1998 | Erickson | 82/160 |
| 6,083,146 A | * | 7/2000 | Early, Jr. | 483/59 |
| 6,318,216 B1 | * | 11/2001 | Eggert et al. | 81/900 |

FOREIGN PATENT DOCUMENTS

JP 403245939 A * 11/1991 .................. 483/59

* cited by examiner

Primary Examiner—Steven C. Bishop
(74) Attorney, Agent, or Firm—Daniel C. Stelter; James C. Eaves, Jr.

(57) ABSTRACT

A cutting tool retention mechanism, for example, typically used to retain a tool holder in a tool pocket of a tool changer magazine. A horizontal machine tool apparatus typically contains a plurality of tool pockets attached to a movable tool changer magazine and the mechanism of the present inventions provides an affirmative mechanism for retaining tool holders so that they do not separate from their respective tool pockets unless removal is desired. More particularly, a pair of opposed pivotal fingers each include a latch which can engage with or disengage from the internal groove of a tool holder to perform this function. Spring bias can be provided to encourage this affirmative engagement of the latches with the internal groove.

26 Claims, 9 Drawing Sheets

TOOL RETENTION MECHANISM

BACKGROUND OF THE INVENTION

1. Technical Field of the Invention

The present invention relates to a tool retention mechanism, for example, typically used to retain a cutting tool holder in a tool pocket of a tool changer magazine. A horizontal machine tool apparatus typically contains a plurality of tool pockets attached to a movable tool changer magazine and the mechanism of the present inventions provides an affirmative mechanism for retaining tool holders so that they do not separate from their respective tool pockets unless removal is desired. More particularly, a pair of opposed pivotal fingers each include a latch which can engage with or disengage from the internal groove of a tool holder to perform this function. A biasing force can be provided, for example, by one or more springs, to encourage this affirmative engagement of the latches with the internal groove.

2. Brief Description of the Related Art

The present invention relates to a cutting tool retention mechanism. This mechanism is designed to be received in a tool pocket and to interface with and retain within the tool pocket a tool holder having an internal groove, such as, for example, a "hohlschaftkegel" (or "HSK") tool holder. An HSK tool holder is a special form of tool holder configured according to a "DIN" (German engineering) standard and designates short, hollow, tapered tool shanks, wherein the tool shank includes a conical surface and a face formed on an integral tool changer gripping flange thereof, and wherein a machine tool spindle is adapted to grip both the conical surface and the face of the tool holder for positive rotation thereof. Unlike well-known ANSI (American National Standards Institute) standard solid tool holders, which are pulled into a spindle seat by way of a retention stud extending from the generally cylindrical shank thereof, an HSK tool shank has an internal relief, or retaining groove, so that, once inside a machine spindle, internal gripping fingers of the spindle assembly direct outward and rearward forces against the tool shank, to retain it securely.

Low-force analogues of spindle gripping arrangements are known for retaining hollow shank tools within tool storage pockets, for example, the employment of spring loaded balls which engage the tool retaining groove. Typically, an external actuating means is employed to release the tool from its tool storage receptacle.

SUMMARY OF THE INVENTION

The present invention relates to a cutting tool retention mechanism, for example, typically used to retain a tool holder in a tool pocket of a tool changer magazine. A tool changer magazine of a horizontal machining center contains a plurality of tool pockets, each of these tool pockets being adapted to store one tool such that, by the tool changer magazine, a plurality of tools are accessible to the machining center for performing a variety of machining operations, for example, utilizing a rotating spindle. In operation, when the machining center needs to utilize any specific tool for a specific machining operation, the tool changer magazine is moved such that the desired tool in its tool pocket is positioned in an index location where the desired tool can be removed from the pocket and mounted to the spindle. Typically, a machining center will retrieve (and replace) between 5 and 25 cutting tools during a complete machining cycle of a typical workpiece. With each tool change, the entire magazine, and as such, each of the tools held in the pockets thereof, moves. Therefore, because of the frequent, and sometimes jerky, movement of the magazine, it is desirable to provide for affirmative retention of the various tool holders in their respective tool pockets until such time as a specific tool is needed is desirable, and the current invention provides for this retention.

All of the embodiments disclosed herein have similar function. In function, a fulcrum supports at least a pair of opposed fingers which function as levers. Springs are used to provide a biasing force such that the bias portions of the opposed fingers are urged toward each other to a physical limit controlled, in one embodiment hereof, by a pair of channels provided in a spring plate. The finger bias portions are on one side of the fulcrum and the finger latch portions are on an opposite side of the fulcrum, such that, in this configuration, opposed latches toward the end of the finger latch portions are spaced a furthest distance from each other. In this configuration, the latches are spaced to engage an internal groove in an HSK tool holder to retain that tool holder in its respective tool pocket.

A tool holder can be forced on and off the latches. For example, when pushing a tool holder into the receiving portion of the tool pocket body, the holder will engage the opposed latches. As these latches are spaced a distance apart greater than the smallest diameter of the holder, a force will be applied to the latches overcoming the biasing force, provided by the springs, which is applied toward the opposite end of the fingers on the other side of the fulcrum. When the holder is pushed into the receiving portion a sufficient distance for engagement of the latches with the HSK tool holder internal groove, the springs will force the latches away from each other to affirmatively hold the tool holder. Alternatively, the finger bias portions can have a force applied thereto to overcome the force of the springs to push the finger bias portions away from each other, as permitted by the geometry of the spring plate channel. The separation of the finger bias portions causes the opposed latches on the finger latch portions on the opposite side to the fulcrum to move toward each other. This action can be initiated for insertion or removal of a tool holder and would cause less parts "wear and tear", but requires additional components to implement.

The preferred embodiment of the present invention employs a unitary tool retention mechanism constructed of plastic. In another embodiment, a unitary plastic tool retention mechanism employs a wear-resistant surface in the form of, in one embodiment hereon, shields attached to the finger latch portions. The shields can be of metal or other material with high wear resistance to prolong the life of the mechanism. Alternatively, the mechanism, itself, can be constructed of a wear-resistant material, in which case, the shields are unnecessary. In yet another embodiment, a plurality of components are employed to permit the fingers to be made of a wear-resistant metallic material, such as steel, with the inclusion of the lever pivot by insertion of pins through bores in a retention support and each finger.

In still another embodiment hereof, a plurality of pairs of opposed fingers, or an odd number of individual fingers, are spaced equidistantly around the support. In an even further embodiment hereof, the pair of opposed fingers is replaced with a single finger, in which case, the latch distance and the bias distance are defined as the distance of the latch and the bias portion, respectively, to a reference, such as, for example, the central axis of the support.

More particularly, in the preferred embodiment hereof, the present invention comprises a retention mechanism having a pair of opposed fingers, each of the fingers extending from a support, each of the fingers having a latch spaced from the support, the support permitting each of the fingers to be pivoted to vary a latch distance between the latches.

Further, where each of the fingers has a latch portion including the latch and a bias portion, and where, when at least one of the fingers is pivoted to vary the latch distance, a bias distance between the bias portions varies oppositely thereto, as permitted by the support. That is, where at least one of the fingers is pivoted to decrease the latch distance, the bias distance will increase, although not necessarily inversely thereto. Additionally, each bias portion may have a spring to exert a biasing force on the bias portion, thereby urging the bias portion in a direction toward the bias portion of the other finger.

As the retention mechanism is designed to permit the latches to engage an internal groove of a tool holder, the latches preferably have an orientation away from each other, although the latches may have any configuration suitable to engage the internal groove of the tool holder.

These and additional objects, features and advantages of the present invention will become apparent to those reasonably skilled in the art from the description which follows, and may be realized by means of the instrumentalities and combinations particularly pointed out therein.

BRIEF DESCRIPTION OF THE DRAWINGS

A better understanding of the present invention will be had upon reference to the following description in conjunction with the accompanying drawings in which like numerals refer to like parts, and wherein:

FIG. 24 shows a perspective view of a tool retention mechanism according to yet another alternative embodiment of the present invention; and, FIG. 25 shows a perspective view of a cage spring plate according to another alternative embodiment of the present invention

DETAILED DESCRIPTION OF THE PREFERRED EMBODIMENTS

Figure 1:
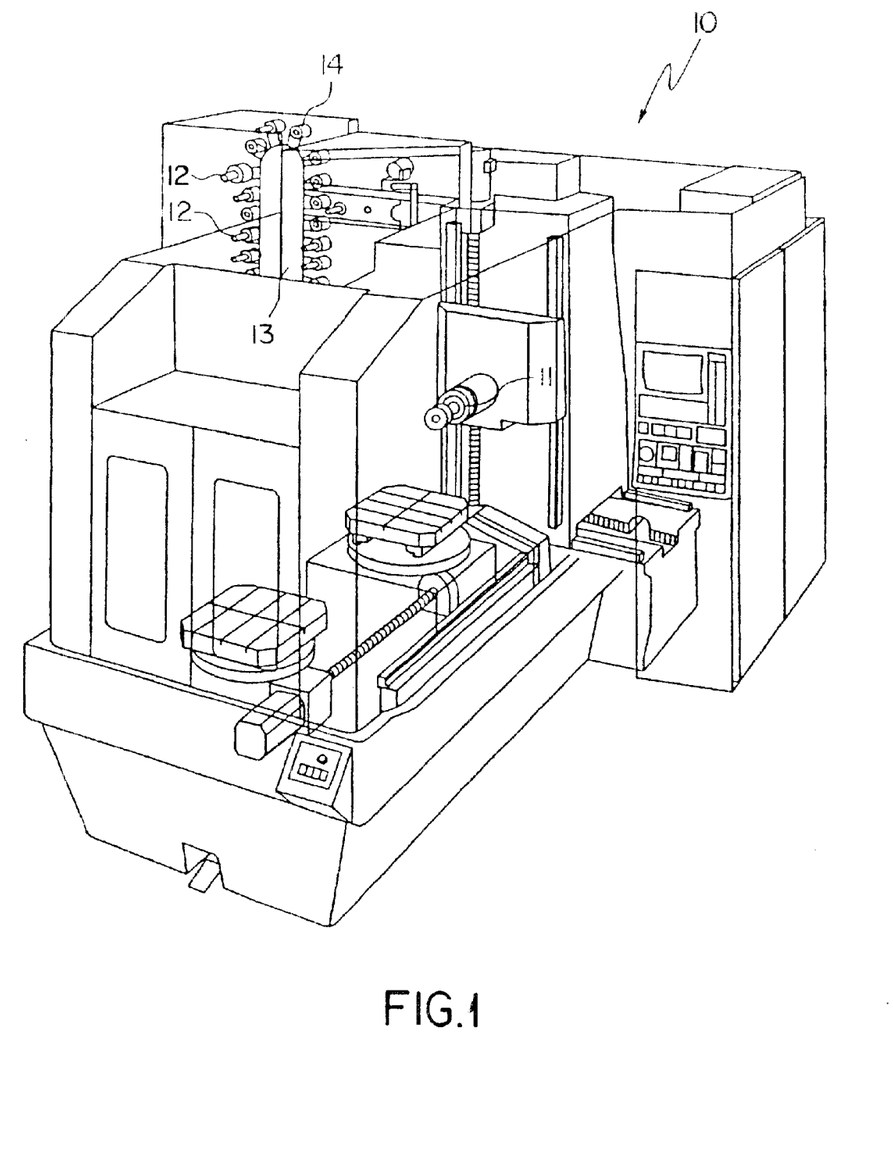
FIG. 1 shows a perspective view of a typical machining center, having a tool storage matrix with a plurality of tool pockets.

With reference to the Figures and, in particular, to FIG. 1 thereof, a machine 10 includes a tool spindle 11 for supporting and driving a variety of tools 12 for performing a variety of machining operations on a workpiece 15. The tool spindle 15 is adapted to grip for positive rotary motion thereof a tool holder 16, which itself, securely grips the cutting tool 12 according to known and conventional techniques, such as, by press-fitting a shank portion 12a of the cutting tool 12 into a shank opening 16a of the tool holder 16. Because each cutting tool 12 can perform but one type of specific machining operation (e.g., milling, boring, etc.), and because a typical machining cycle of the workpiece 15 requires a number of different machining operations, the machine 10 is equipped with a tool storage matrix or magazine comprising a movable chain 13, along which are positioned a plurality of tool storage modules or tool pockets 14, especially adapted for supporting a hollow shank tool holder, such as an HSK tool holder. The present invention is directed to the tool pocket 14 and, more specifically, its capability to affirmatively retain an HSK tool holder 16 therein.

Reference numerals are used in the figures for identification, as follows: 2—portion of tool holder; 4—internal groove in tool holder; 10—machine; 11—tool spindle; 12—cutting tool; 12a—tool shank; 13—movable chain or magazine; 14—tool pocket; 15—workpiece; 16—tool holder; 16a—tool holder shank opening; 20—HSK tool pocket body; 22—front of body; 24—rear of body; 26—tool holder receiving portion; 28—latch opening; 30—retainer/cage receiving opening; 32—alignment member channel; 34—bore; 40—tool retention mechanism (first embodiment); 42—center support; 44—alignment member; 45—latch; 46—finger; 48—latch portion; 50—latch;

52—bias portion; 54—spring support tip; 60—tool cage bushing; 62—center support engaging end; 64—plate engaging end; 66—base; 68—opposed curved sides; 70—channel; 72—elongated opening; 74—bore; 76—spring channel; 80—cage spring plate; 82—center opening; 84—side spring receiving channel; 86—spring support tip; 88—bore; 90—threaded screw or bolt; 92—washer; 94—nut; 96—compression spring; 140—tool retention mechanism (second embodiment); 146—finger; 148—latch portion; 150—latch; 156—opening; 157—"V"-shaped shield; 158—lips; 240—metal retainer (third embodiment); 241—near center bore; 243—washer; 245—pin; 246—finger; 248—latch portion; 250—latch; 252—bias portion; 253—bore; 254—pin; 260—tool cage bushing retainer support; 268—opposed sides; 269—bore; and, 270—channel.

Figure 2:
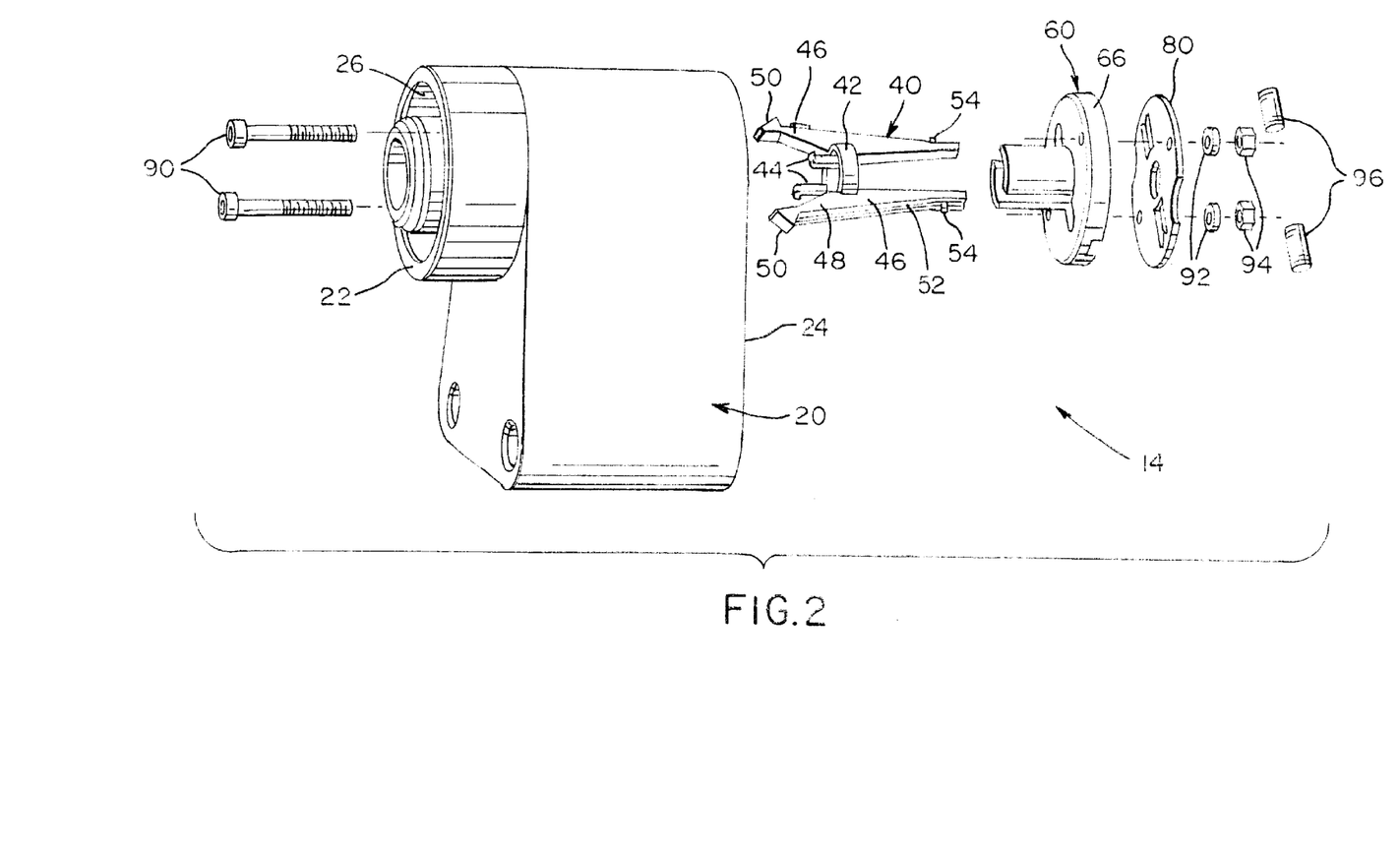
FIG. 2 shows an exploded perspective view of a tool pocket according to a preferred embodiment of the present invention.
Figure 3:
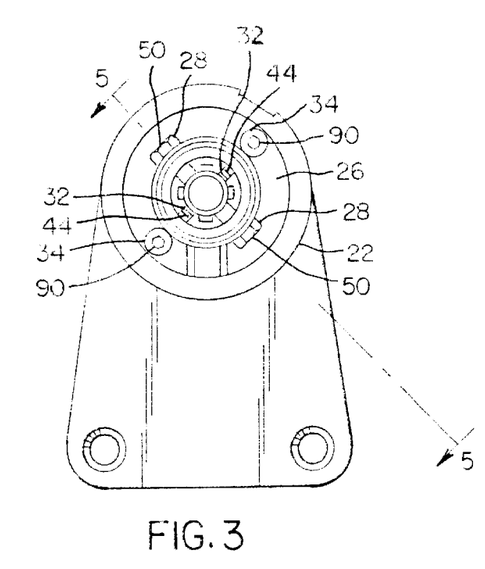
FIG. 3 shows a front view of the tool pocket of FIG. 2.

With reference to FIGS. 2–16, a tool pocket 20 according to the preferred embodiment hereof is shown. In FIG. 2, the tool pocket body 20 is shown having a front 22 and a rear 24. With additional reference to FIGS. 3–5, tool pocket body 20 includes a tool holder receiving portion 26, opposed latch openings 28, a retainer/cage opening 30, opposed alignment member channels 32; and a pair of throughbores 34. From the rear 24, a tool retention mechanism 40 is inserted into opening 30 so that alignment members 44 engage channels 32 and latches 50 are received in latch openings 28. A tool cage bushing 60, a cage spring plate 80, and springs 96 are also inserted from the rear 24. Then, threaded bolts 90 are inserted through respective bores 34 of body 20, bores 74 of bushing 60 (FIG. 11), and bores 88 of plate 80 (FIG. 14), and washers 92 and nuts 94 are inserted onto the ends of bolts 90, the nuts 94 being tightened to secure the mechanism 40, bushing 60, and plate 80 within the tool pocket body 20.

With particular reference to FIGS. 6–10, the preferred tool retention mechanism 40 is shown. Mechanism 40 is preferably made from a molded plastic, although other materials, such as sufficiently flexible metal or composite materials including shape memory and superelastic metal alloys, could be used. FIG. 2 shows the proper orientation of mechanism 40 for insertion into opening 30 in the rear 24 of pocket body 20. Mechanism 40 includes a center support 42, to which a pair of opposed fingers 46 and a pair of opposed alignment members 44 are attached or are integrally-formed therewith. From the view of FIG. 8, it is seen that opposed fingers 46 are at the top and bottom, such as at the twelve o-clock and six o-clock positions, respectively, and opposed alignment members 44 are at the left and right, such as at the three o-clock and nine o'clock positions, respectively. In this orientation, fingers 46 and alignment members 44 are spaced equidistantly around the support 42 and alternate with one another.

Figure 5:
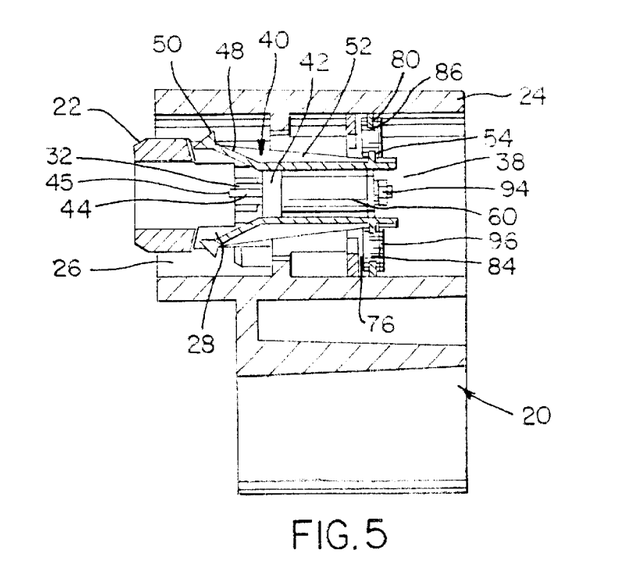
FIG. 5 shows a cross-section view of the tool pocket of FIG. 2, shown along section line 5—5 of FIG. 3.
Figure 6:
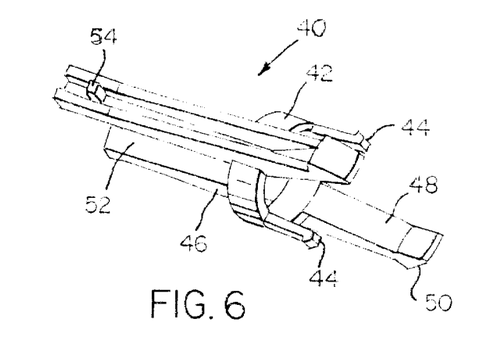
FIG. 6 shows a perspective view of a tool retention mechanism of the tool pocket of FIG. 2.
Figure 10:
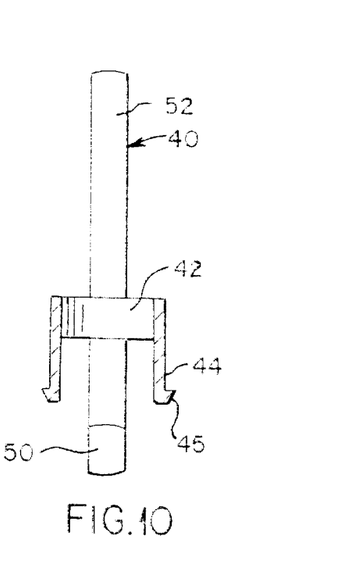
FIG. 10 shows a cross-section view of the retention mechanism of FIG. 6, shown along section line 10—10 of FIG. 8.

FIG. 10 shows that opposed alignment members 44 can each include a latch 45. As is best seen in FIG. 5, when tool retention mechanism 40 is inserted into body 20, latches 45 of opposed alignment members 44 each engage in one of the alignment member channels 32 of body 20 to retain mechanism 40 so that latches 50 are properly positioned, relative to the latch openings 28.

Figure 7:
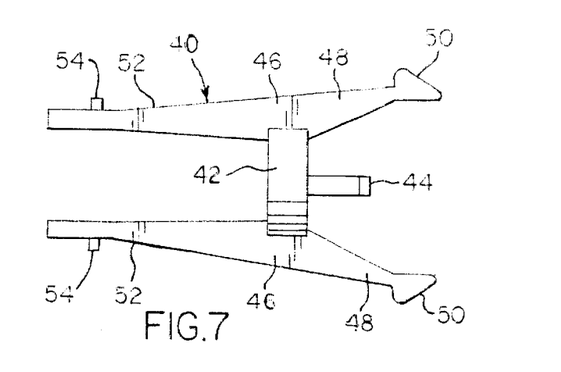
FIG. 7 shows a side view of the tool retention mechanism of FIG. 6.
Figure 8:
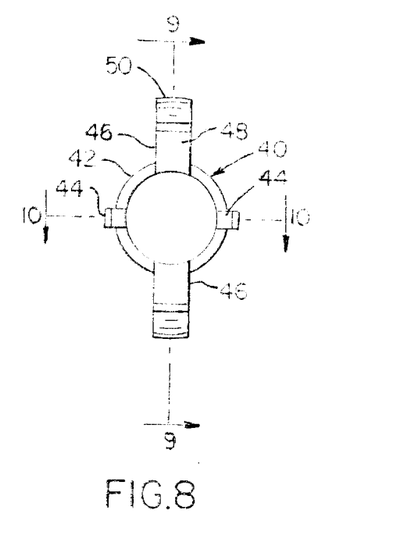
FIG. 8 shows an end view of the tool retention mechanism of FIG. 6.
Figure 9:
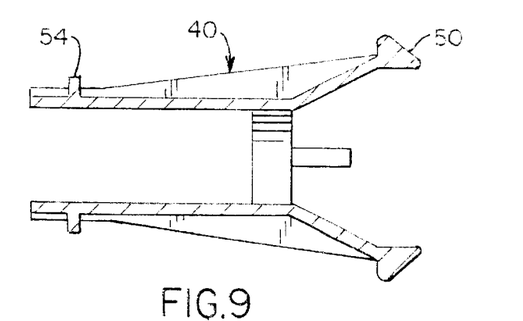
FIG. 9 shows a cross-section view of the tool retention mechanism of FIG. 6, shown along section line 9—9 of FIG. 8.

Fingers 46 include a latch portion 48, shown positioned to the right side of center support 42 in FIG. 7, and a bias portion 52, shown positioned to the left side of center support 42 in FIG. 7. Latch 50 is seen toward an end of the latch portion 48 of each finger 46, distant from center support 42. Spring support tip 54 is shown positioned toward an end of bias portion 52 of each finger 46, distant from center support 42.

Center support 42 functions as a fulcrum for the fingers 46, which work like a pair of opposed levers. As will be explained in greater detail below, with particular reference to FIG. 7, it will be apparent to one of ordinary skill in the art upon reading the within description, that if opposed bias portions 52 are forced toward one another, for example by exerting inwardly-directed biasing forces at spring support tips 54, the center support 42 will function as a fulcrum for the pivoting of both fingers 46 such that, the opposed latches 50, in response, will be forced away from each other. In contrast, if opposed bias portions 52 are forced away from one another, with center support 42 providing the fulcrum for the pivoting of both fingers 46, the opposed latches 50, in response, will be forced toward one another.

Figure 11:
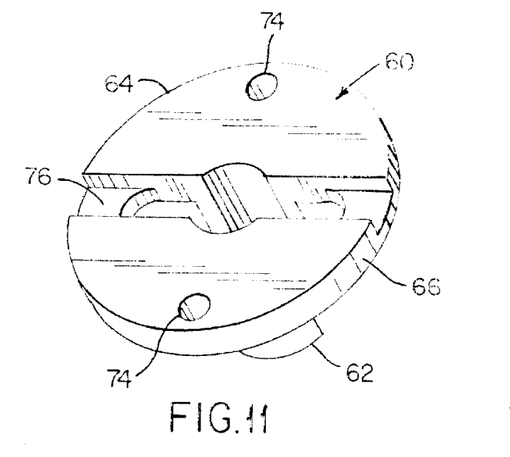
FIG. 11 shows a perspective view of a tool cage bushing according to the tool pocket of FIG. 2.
Figure 12:
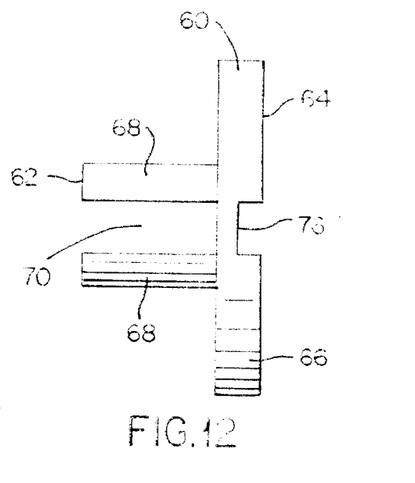
FIG. 12 shows a side view of the tool cage bushing of FIG. 11.
Figure 13:
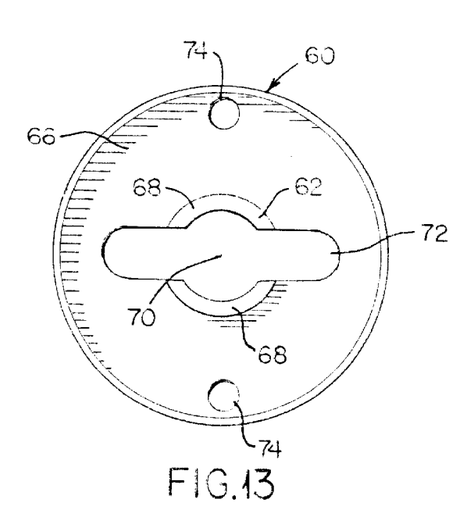
FIG. 13 shows an end view of the tool cage bushing of FIG. 11.

With particular reference to FIGS. 11–13, the preferred tool cage bushing 60 is shown. Bushing 60 is preferably made from aluminum, although other materials could be used, for example, any sufficiently rigid plastic, hard rubber or composite material. FIG. 2 shows the proper orientation of bushing 60 for insertion into opening 30 in the rear 24 of pocket body 20. Bushing 60 includes a center support engaging end 62, which abuts the center support 42 of the mechanism 40, and a plate engaging end 64. A pair of opposed curved sides 68 with channel 70 therebetween extend from base 66, a distal end defining support engaging end 62. Base 66 contains an elongated opening 72 therethrough which is sized such that the end portions of the bias portion 52 of fingers 46 can pass therethrough and be operable to and from each other without interference from opening 72. From the plate engaging end 64 of base 66, a spring receiving channel 76 extends across the base 66 and is in alignment with opening 72. Base 66 also contains a pair of throughbores 74, spaced from the spring receiving channel 76, which are sized to receive bolts 90 therethrough.

Figure 14:
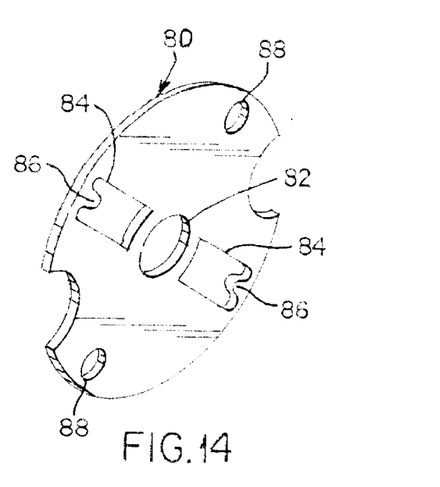
FIG. 14 shows a perspective view of a cage spring plate according to the tool pocket of FIG. 2.

With particular reference to FIGS. 14 and 2, the preferred cage spring plate 80 is shown. Plate 80 includes a center opening 82 and a pair of outwardly extending side spring receiving channels 84, the inner edge of each of which serving as an inner limit or stop for movement of respective bias portions 52. The outer edges of both channels 84 each include an inwardly extending spring support tip 86. Plate 80 also contains a pair of throughbores 88 which are sized to receive bolts 90 therethrough. Plate 80 will abut the plate engaging end 64 of bushing 60.

Figure 4:
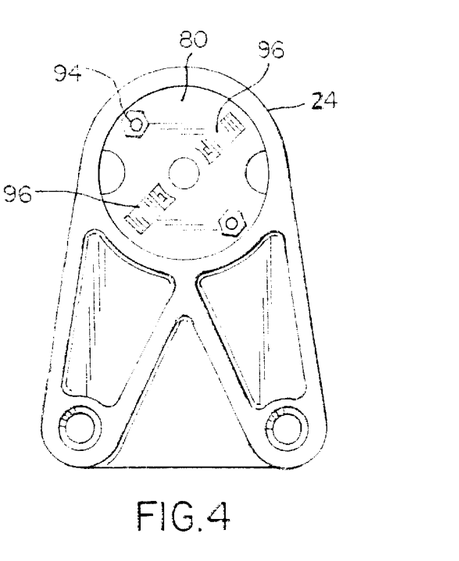
FIG. 4 shows a rear view of the tool pocket of FIG. 2.

As seen best in FIGS. 2, 4, and 5, with the mechanism 40, bushing 60, and plate 80 inserted into opening 30 in the rear 24 of pocket body 20, throughbores 34 (in pocket body 20), 74 (in tool cage bushing 60), and 88 (in plate 80) are in axial alignment with one another and receive bolts 90 from the front 22 of the pocket body 20, with bolts 90 extending beyond plate 80 toward the rear 24 of the pocket body 20, and receive washers 92 and nuts 94 from the rear 24 of the pocket body to engage rearwardmost ends of the bolts 90, thereby securing mechanism 40, bushing 60, and plate 80 within the pocket body 20. The bias portions 52 of each finger 46 extend through elongated opening 72 through one of channels 84 in the plate 80. With plate 80 abutting end 64, channels 84 and channel 76 are in alignment with the spring support tip 54 of each finger 46 and also in facing alignment with an opposed spring support tip 86 in the plate 80. Two compression springs 96 are employed to bias the bias portions 52 of the fingers 46 toward one another, as permitted by the plate channels 84. The open ends of each spiral spring 96 are received by a pair of cooperating tips 54, 86, the springs 96 being partway received in respective cooperating channels 84, 76.

Figure 15:
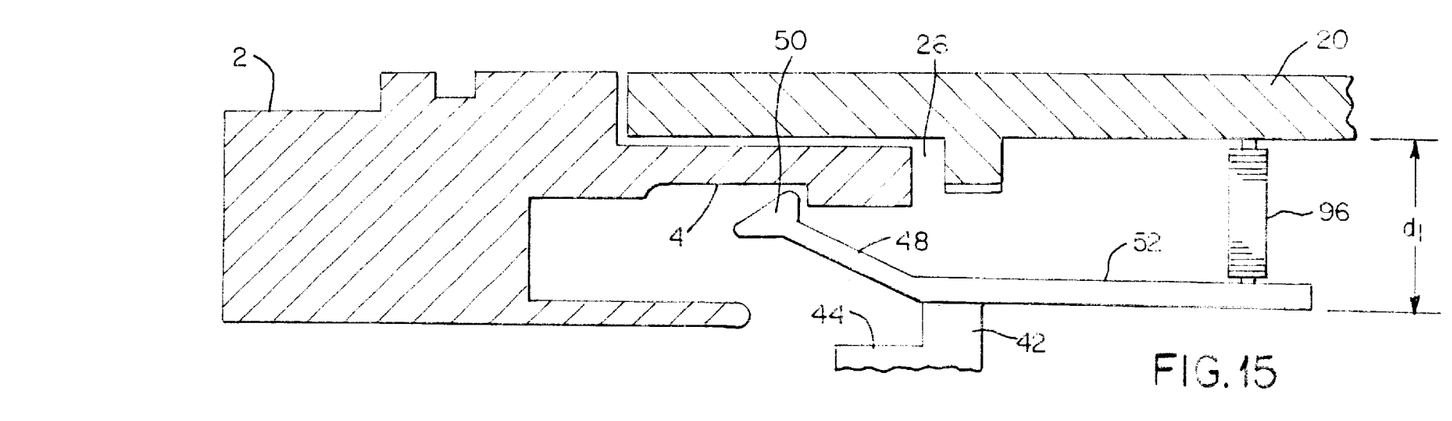
FIG. 15 is a rendering generally demonstrating how a latch of the tool retention mechanism of FIG. 6 engages an internal retaining groove of an HSK tool holder so that the tool pocket retains the tool holder.
Figure 16:
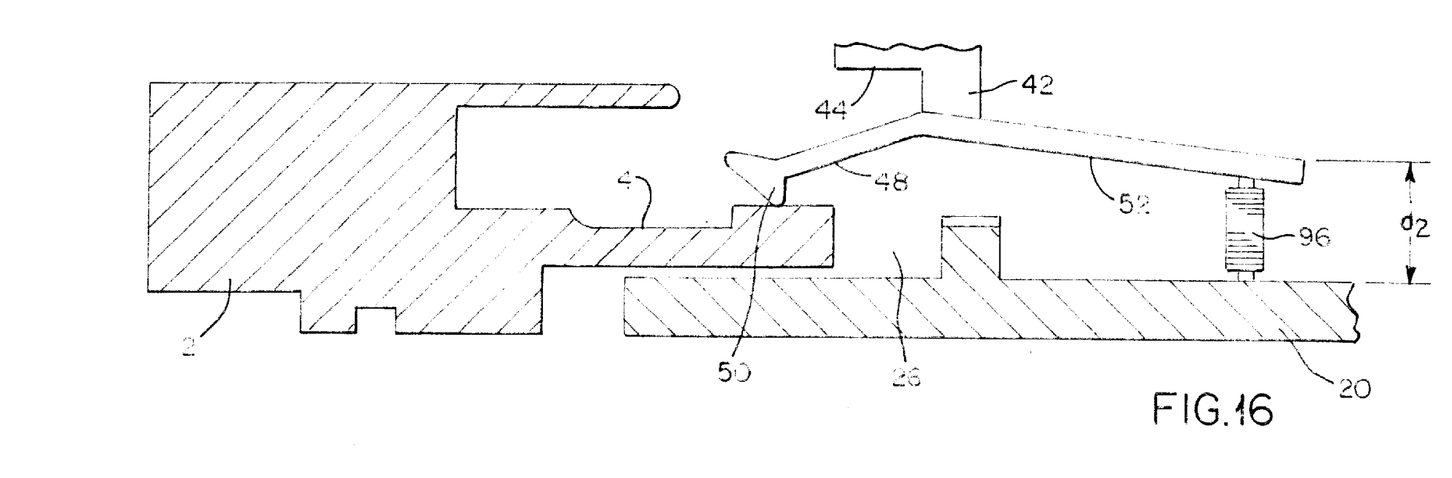
FIG. 16 is a rendering generally demonstrating how a latch of the tool retention mechanism of FIG. 6 is pivoted so that an HSK tool holder can be removed from the tool pocket of FIG. 2.

Therefore, springs 96 urge opposed bias portions 52 of fingers 46 toward one another to the inner limit permitted by the inner edges of channels 84 or by the stiffness of the fingers 46 or of the finger 46-support 42 connection. Channels 84 permit movement of portions 52 away from each other if the force of the springs 96 is opposed. A representation of this is shown in FIGS. 15 and 16. In FIG. 15, bias portion 52 is spaced a distance "$d_1$" from a reference surface, such as, a portion of pocket body 20, for example, an inner surface of the opening 30. When the bias portion 52 is in the position shown in FIG. 15, latch 50 of latch portion 48 is received by the internal groove 4 of a portion of an HSK tool holder 2. Internal groove 4 preferably is a continuous circular groove and, while not shown in this rendering, both of the latches 50 will be received in the groove 4. The latches 50 are shaped such that, when received by the groove 4, the tool holder 20 is retained in the tool holder receiving portion 26 of tool pocket body 20.

As shown in FIG. 16, spring 96 may be compressed more than spring 96 of FIG. 15, such as, by applying a release force "F" directed against the biasing force of the spring 96. As such, when the release force "F" exceeds the biasing force, the bias portion 52 will move to a position whereat the bias portion 52 is spaced a distance "$d_2$" from the inner surface of the opening 30, the distance $d_2$ being a distance less than the distance $d_1$. In response, the latch 50 will move inwardly as the bias portion 52 and latch portion 48 each pivot about the center support 42. When the mechanism 40 is in the position whereat the latch 50 no longer engages the groove 4 of the tool holder 2, the tool holder 2 can be removed from, or inserted into, from the tool holder receiving portion 26 of the tool pocket body 20.

Figure 17:
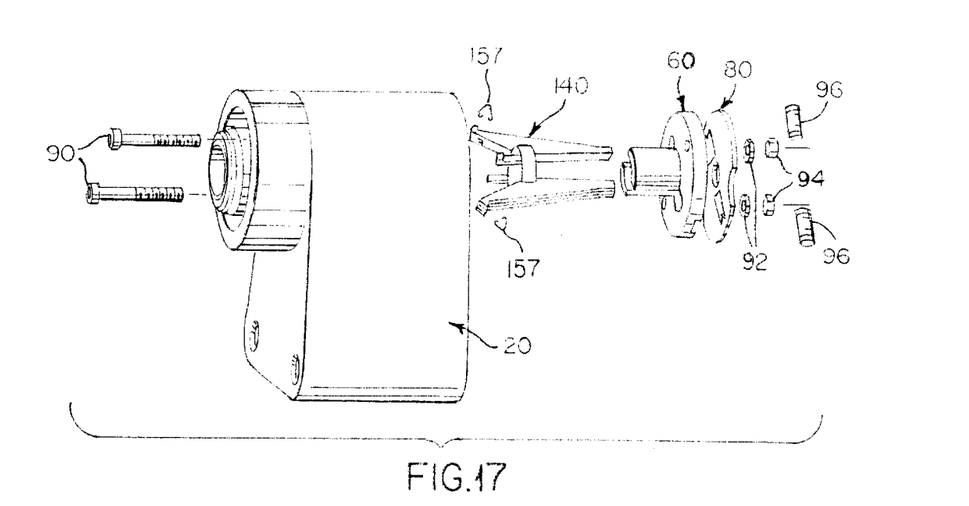
FIG. 17 shows an exploded perspective view of a tool pocket according to an alternative embodiment of the present invention.
Figure 18:
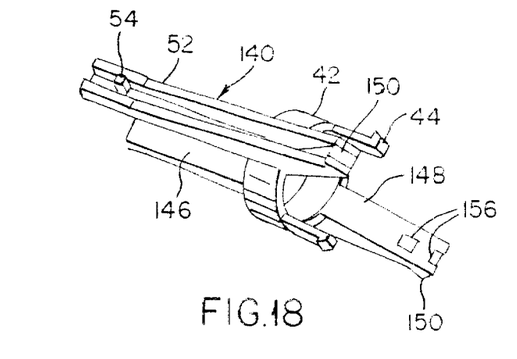
FIG. 18 shows a perspective view of a tool retention mechanism of the tool pocket of FIG. 17.
Figure 19:
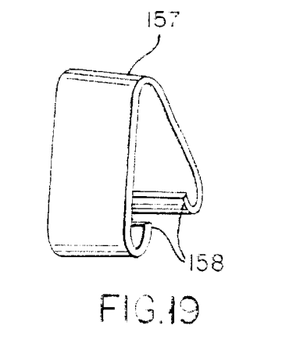
FIG. 19 shows a perspective view of a latch shield for the tool retention mechanism of the tool pocket of FIG. 17.

With reference to FIGS. 17–19, one alternative embodiment of the present invention is shown. Tool pocket body 20, bushing 60, plate 80, bolts 90, washers 92, nuts 94, and springs 96 are identical to those employed with the preferred embodiment hereof, and like reference numerals are intended to represent like components. However, in the present embodiment, the tool retention mechanism 140 has been modified. The main portion of mechanism 140 is again preferably made of plastic, as was mechanism 40. However, to provide for longer wear of the latches 150, each finger 146 includes a wear-resistant surface, for example, a V-shaped shield 157 which is sized and shaped to cover the wear surfaces of the latch 150. The shields 157 are made of a metallic or other wear-resistant material, and each shield 157 includes one or more lips 158 which are used to securely each grip the latch 150 of latch portion 148 of one of the fingers 146. One or more openings 156 may be provided on each latch portion 148 to receive lips 158 to attach the shield 157. As shield 157 engages groove 4 of tool holder 2, better component life is provided. Although the wear-resistant surfaces have been described as separate shields 157 which can be affixed to the latches 150 (and removed therefrom for replacement, if necessary, the same effect of which can be provided by constructing the mechanism 140, or any portion thereof, out of a wear-resistant material, in which case, shields 157 are not necessary.

Figure 20:
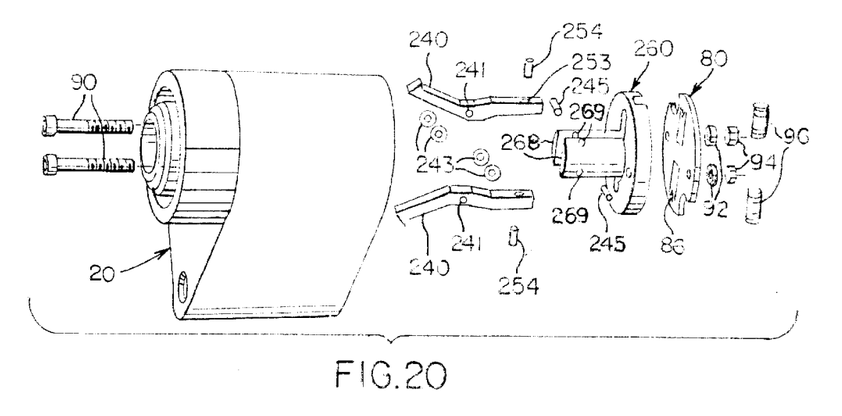
FIG. 20 shows an exploded perspective view of a tool pocket according to another alternative embodiment of the present invention.
Figure 21:
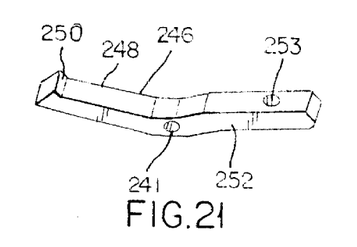
FIG. 21 shows a perspective view of one finger of the tool retention mechanism of the tool pocket of FIG. 17.
Figure 22:
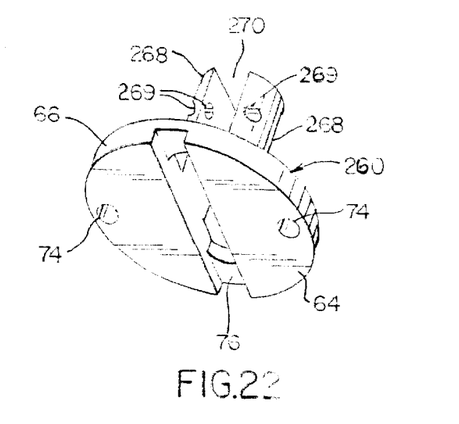
FIG. 22 shows a perspective view of a retainer support of the tool pocket of FIG. 17.

With reference to FIGS. 20–22, another alternative embodiment of the present invention is shown. Tool pocket body 20, plate 80, bolts 90, washers 92, nuts 94, and springs 96 are identical to those employed with the preferred embodiment thereof and like reference numerals are intended to represent like parts, however, in the present embodiment, the fingers 246 are constructed of metal or other wear-resistant material. Because steel is the preferred material for the mechanism 240 according to the present embodiment, and because the stiffness of steel is significantly higher than the stiffness of most plastic materials, the entire tool retention mechanism can not be a unitary metal piece for the lever/fulcrum to function as described herein. Therefore, the metal retainers 240 comprise a pair of individual fingers 246. Each finger 246 includes a throughbore 241 near the finger 246 center. Each finger 246 will pivot about its bore 241. Each finger 246 includes a latch portion 248 to one side of bore 241 and a bias portion 252 to the opposed side of bore 241. Toward the end of latch portion 248 away from bore 241 is a latch 250. Toward the end of bias portion 252 away from bore 241 is a bore 253 which receives a pin 254. While pin 254 could be formed as a unitary part of finger 246, the manufacture is easier if pin 254 is a separate element.

Each latch 250 will function as latches 50, 150 of the previous embodiments and each pin 254 will function as spring support tip 54 of the previous embodiments. To support this function, tool cage bushing 60 is modified to be a retainer support 260 and provide the fulcrum or pivot point for both fingers 246. Opposed curved sides 268, with a channel 270 therebetween, include a pair of aligned bores 269, each pair of bores 269 going through both sides 268. Fingers 246 are connected to support 260 using washers 243 and pins 245. A pin 245 passes through one bore 269 in one side 268, through a washer 243, through bore 241, through a washer 243, and through the aligned bore 269 in the opposed side 268. This provides for operation as explained with the prior embodiments, springs 96 being contained between pins 254 and respective tips 84. Fingers 246 can pivot about pins 245 as fingers 46,146 pivot about center support 42, as described in the prior embodiments.

Figure 23:
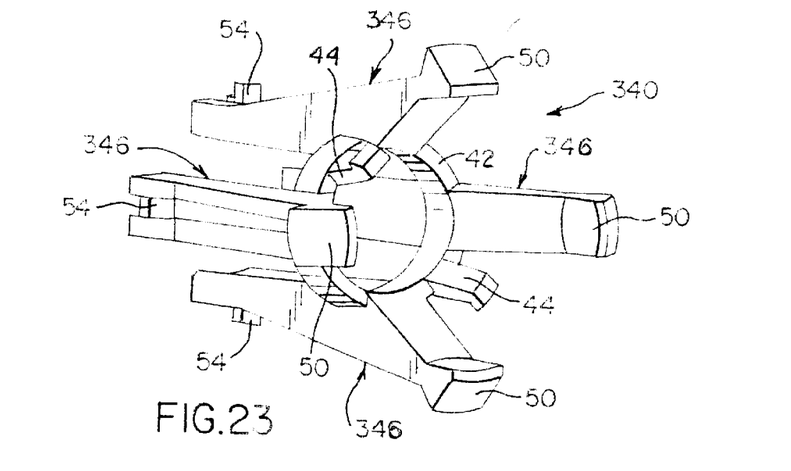
FIG. 23 shows a perspective view of a tool retention mechanism according to yet another alternative embodiment of the present invention.

With reference to FIG. 23, a tool retention mechanism 340 according to yet another alternative embodiment of the present invention includes many components in common with the tool retention mechanism 40 (FIG. 6) of the preferred embodiment hereof, and like reference numerals are intended to represent like components. However, the tool retention mechanism 340 according to the present embodiment includes more than one pair of opposing fingers 346, for example, two pair of opposing fingers 346 providing four such fingers 346 spaced equidistantly around the support 342 with alignment members 44 being positioned between first and second pairs of fingers 346. Of course, tool pocket body 20, plate 80, bushing 60, and the components thereof, must all be modified to receive the mechanism 340 of the present embodiment, however, such modifications will be apparent to one of ordinary skill in the art upon reading the within description.

Figures 24, 25:
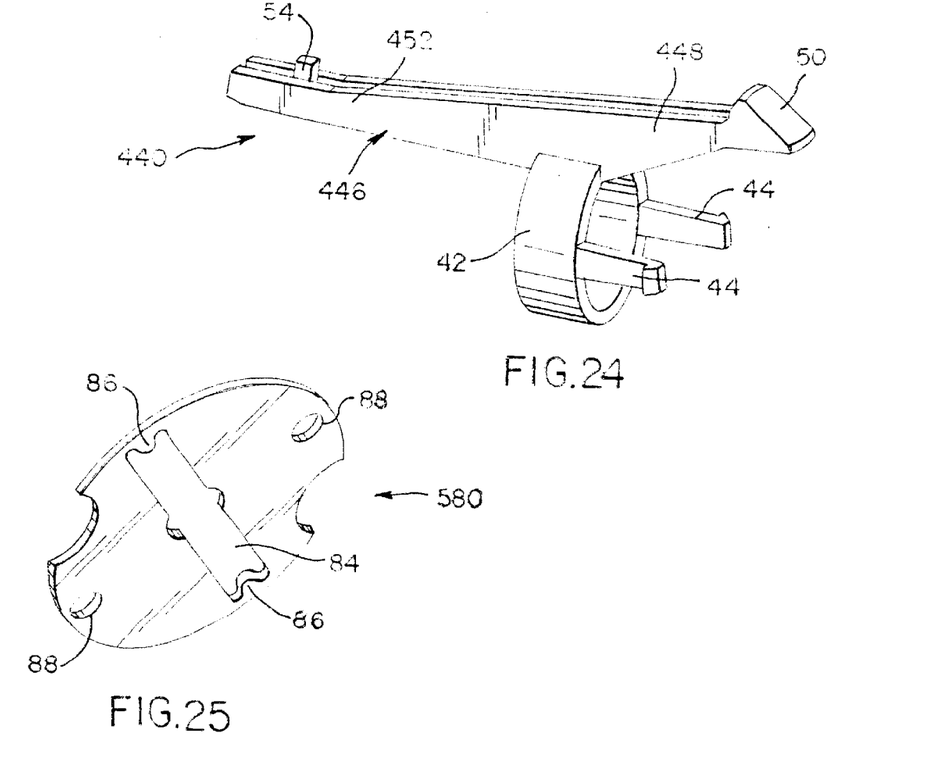

With reference to FIG. 24, a tool retention mechanism according to still another alternative embodiment of the present invention includes many components in common with the tool retention mechanism 40 (FIG. 6) of the preferred embodiment hereof, and like reference numerals are intended to represent like components. However, the tool retention mechanism 340 according to the present embodiment includes only one finger 446, preferably spaced between the alignment members 44. Although not depicted in the drawings, any number of fingers, including any odd number of fingers, can be provided spaced around the support, either equidistantly or otherwise, without departing from either the spirit or the scope of the present invention. In any such case, it will be apparent to one of ordinary skill in the art, upon reading the within description, how to modify the tool pocket body 20, and its associated components, for the purpose of receiving the mechanism.

With reference to FIG. 25, a spring plate 580 according to one alternative embodiment of the present invention includes many components in common with the spring plate 80 (FIG. 14) according to the preferred embodiment hereof and like reference numerals are intended to represent like components. However, the spring plate 580 according to the present embodiment includes a continuous channel 584 extending across the plate 580 such that outermost ends thereof are disposed, relative to the outer periphery of the plate 580, much like respective outermost ends of the channels 84 (FIG. 14) of the plate 80 (FIG. 14) according to the preferred embodiment hereof. However, the spring plate 580 of the present embodiment differs from the spring plate 80 (FIG. 14) of the preferred embodiment integrally-formed stops have been removed therefrom. Inward travel of the bias portions 52 (FIG. 5) would be limited either by a separate component (not shown) known to those of ordinary skill in the art) or by the material properties (i.e., stiffness) of the fingers 46.

While the invention has been illustrated with reference to one or more preferred embodiments hereof, and such preferred embodiments have been described in considerable detail with reference to the drawings, it is not the intention of applicants that the invention be restricted to such detail.

I claim:

1. A retention mechanism, comprising: at least one pair of opposed fingers, each of said fingers extending from a support, each of said fingers having a latch spaced from said support, said support permitting each of said fingers to be moved to vary a latch distance between said latches, wherein each of said fingers has a latch portion including said latch and a bias portion, and wherein, when at least one of said fingers is moved to vary said latch distance, a bias distance between said bias portions varies oppositely thereto, and wherein a biasing force is exerted on said bias portion of at least one finger of said at least one pair of fingers to urge said bias portion in a direction toward the bias portion of the other finger of said at least one pair of fingers.

2. The retention mechanism of claim 1, wherein said biasing force is exerted by a spring.

3. The retention mechanism of claim 1, wherein said latches have an orientation away from each other.

4. The retention mechanism of claim 1, wherein at least one finger of said at least one pair of fingers forms a unitary construction with said support.

5. The retention mechanism of claim 4, wherein said retention mechanism is constructed of a material having a stiffness which permits deflection of said at least one finger relative to said support.

6. The retention mechanism of claim 5, wherein said retention mechanism is constructed of plastic.

7. The retention mechanism of claim 1, wherein said latch of at least one finger of said at least one pair of fingers includes a wear-resistant surface.

8. The retention mechanism of claim 7, wherein said wear-resistant surface is provided by a shield affixed over at least a portion of said latch.

9. The retention mechanism of claim 1, wherein said at least one pair of fingers and said support are individual components, at least one finger of said at least one pair of fingers being pivotally connected to said support.

10. The retention mechanism of claim 9, wherein at least one finger of said at least one pair of fingers is constructed of a wear-resistant material.

11. The retention mechanism of claim 10, wherein said wear-resistant material is metal.

12. A retention mechanism, comprising:
at least one pair of opposed fingers, said fingers of said at least one pair of fingers being connected to one another by a support, said support defining a latch portion and a bias portion of each finger of said at least one pair of fingers, at least one finger of said at least one pair of fingers forming a unitary construction with said support, said latch portion of each finger of said at least one pair of fingers having a latch spaced from said support, said latches being oriented away from each other, said support permitting movement of each finger of said at least one said fingers relative to said support, to vary a latch distance between said latches;
a plate having at least one channel;
a bushing positioned between said support and said plate , said bias portion of each finger of said at least one pair of fingers extending through one of said at least one channel, where, when at least one of said fingers is moved, said latch distance varies oppositely to a bias distance between said bias portions.

13. The retention mechanism of claim 12, wherein a biasing force is exerted on said bias portion of at least one finger of said at least one pair of fingers to urge said bias portion in a direction toward the bias portion of the other finger of said at least one pair of fingers.

14. The retention mechanism, of claim 13, wherein said biasing force is exerted by a spring.

15. The retention mechanism of claim 14, wherein said spring is disposed between an outer support tip of said at least one support channel and a spring support tip extending from said bias portion toward said at least one channel.

16. The retention mechanism of claim 12, wherein said latch of at least one finger of said at least one pair of fingers includes a wear-resistant surface.

17. The retention mechanism of claim 16, wherein said wear-resistant surface is provided by a shield affixed over at least a portion of said latch.

18. The retention mechanism of claim 12, where said retention mechanism is made of plastic.

19. A retention mechanism, comprising:
at least one pair of opposed fingers, each said finger having a throughbore dividing said finger into a latch portion and a bias portion;
a support having a base and at least one pair of opposed sides extending from an end of said base, said base having an opposed plate end, said pair of opposed sides having a channel therebetween, said pair of opposed sides having a pair of axially aligned throughbores, each of said axially aligned throughbores having a pivot pin inserted therethrough, each said finger partways received by said channel with one said pivot pin passing through said bore in one of said fingers and the other said pivot pin passing through said bore in said other one of said fingers, each of said latch portions having a latch spaced from said support, said latches having an orientation away from each other, said support permitting movement of said opposed fingers to vary a latch distance between said latches; and,
a flat plate, said plate having at least one pair of opposed channels, said flat plate abutting said opposed plate end of said base of said support, one of said opposed fingers having its respective said bias portion extending through one of said flat plate opposed channels, the other of said opposed fingers having its respective said bias portion extending through the other one of said flat plate opposed channels, said flat plate opposed channels limiting a range of movement of said opposed finger bias portions, where, when at least one of said opposed fingers is moved, said latch distance varies oppositely to a bias distance between said bias portions.

20. The retention mechanism of claim 19, where each said bias portion has a spring exerting a biasing force on said bias portion to urge said bias portion in a direction toward the bias portion of the other said finger.

21. The retention mechanism of claim 20, where each said spring is received between an outer support tip in its respective flat plate support channel and a spring support tip extending from the corresponding bias portion extending through the respective flat plate channel.

22. The retention mechanism of claim 21, where said mechanism is inserted into a rear portion of a tool pocket body and retained therein, said tool pocket body having a tool holder receiving portion in a front portion of said tool pocket body, said tool holder receiving portion having a pair of interior latch openings, each said latch opening receiving one of said finger latches, said latches having a first spacing therebetween where said latches can engage an internal groove of a tool holder inserted into said tool holder receiving portion to affirmatively retain said tool holder, said opposed finger bias portions being separable from each other to move said latches to have a second distance therebetween, said second distance having a value less than said first distance, where said latches can not engage said internal groove.

23. A tool pocket, comprising:
a tool pocket body having a front portion and a rear portion, said tool pocket body having a tool holder receiving portion in said front portion, said tool holder receiving portion having a pair of interior latch openings in communication with a retainer/cage receiving opening in said rear portion;
a retention mechanism having a pair of opposed fingers, each of said fingers having a latch spaced from a support, said support permitting each of said fingers to be moved to vary a latch distance between said latches, said latches having an orientation away from each other;
said retention mechanism received into said retainer/cage receiving opening, said support abutting said tool pocket body, each said latch opening receiving one of said finger latches, said latches having a first spacing therebetween where said latches can engage an internal groove of a tool holder inserted into said tool holder receiving portion to affirmatively retain said tool holder, said opposed finger bias portions being separable from each other to move said latches to have a second distance therebetween, said second distance having a value less than said first distance, where said latches can not engage said internal groove.

24. The tool pocket of claim 23, where said tool pocket body has an alignment member channel and said retention mechanism support has a pair of alignment members, said alignment members being received by said alignment member channel and affirmatively retained therein.

25. The tool pocket of claim 24, where each of said opposed fingers has a spring exerting a force thereon to urge said latches in opposed directions.

26. A retention mechanism, comprising:
at least one finger extending from a support, said support defining a latch portion and a bias portion of said finger, said latch portion of said finger having a latch spaced from said support, said support permitting movement of said finger;
a plate having a channel;
a bushing positioned between said support and said plate, said bias portion of said finger extending through said channel, where, when said finger is moved, said latch portion and said bias portion move generally in opposite directions.

\* \* \* \* \*